United States Patent
He et al.

(10) Patent No.: US 9,942,570 B2
(45) Date of Patent: Apr. 10, 2018

(54) RESOURCE EFFICIENT VIDEO PROCESSING VIA PREDICTION ERROR COMPUTATIONAL ADJUSTMENTS

(71) Applicant: Freescale Semiconductor, Inc., Austin, TX (US)

(72) Inventors: Zhong Li He, Schaumburg, IL (US); Yong Yan, Austin, TX (US)

(73) Assignee: NXP USA, INC., Austin, TX (US)

( * ) Notice: Subject to any disclaimer, the term of this patent is extended or adjusted under 35 U.S.C. 154(b) by 56 days.

(21) Appl. No.: 15/198,947

(22) Filed: Jun. 30, 2016

(65) Prior Publication Data

US 2016/0316226 A1    Oct. 27, 2016

Related U.S. Application Data

(62) Division of application No. 11/271,693, filed on Nov. 10, 2005, now Pat. No. 9,479,794.

(51) Int. Cl.
*H04B 1/66* (2006.01)
*H04N 19/65* (2014.01)
(Continued)

(52) U.S. Cl.
CPC ........... *H04N 19/65* (2014.11); *H04N 19/102* (2014.11); *H04N 19/124* (2014.11); *H04N 19/134* (2014.11); *H04N 19/14* (2014.11); *H04N 19/152* (2014.11); *H04N 19/156* (2014.11); *H04N 19/162* (2014.11); *H04N 19/176* (2014.11); *H04N 19/513* (2014.11); *H04N 19/523* (2014.11); *H04N 19/61* (2014.11)

(58) Field of Classification Search
None
See application file for complete search history.

(56) References Cited

U.S. PATENT DOCUMENTS

| 4,488,175 A | 12/1984 | Netravali |
| 5,134,476 A | 7/1992 | Aravind et al. |

(Continued)

FOREIGN PATENT DOCUMENTS

| EP | 0736843 A2 | 10/1996 |
| EP | 1315380 A2 | 5/2003 |

(Continued)

OTHER PUBLICATIONS

Notice of Allowance dated Sep. 18, 2017 in U.S. Appl. No. 11/539,522.

(Continued)

*Primary Examiner* — Mark Roz

(57) ABSTRACT

A video processing system dynamically adjusts video processing prediction error reduction computations in accordance with the amount of motion represented in a set of image data and/or available memory resources to store compressed video data. In at least one embodiment, video processing system adjusts utilization of prediction error computational resources based on the size of a prediction error between a first set of image data, such as current set of image data being processed, and a reference set of image data relative to an amount of motion in a current set of image data. Additionally, in at least one embodiment, the video processing adjusts utilization of prediction error computation resources based upon a fullness level of a data buffer relative to the amount of motion in the current set of image data.

8 Claims, 6 Drawing Sheets

(51) Int. Cl.

| | | |
|---|---|---|
| H04N 19/176 | (2014.01) | |
| H04N 19/134 | (2014.01) | |
| H04N 19/102 | (2014.01) | |
| H04N 19/61 | (2014.01) | |
| H04N 19/124 | (2014.01) | |
| H04N 19/14 | (2014.01) | |
| H04N 19/152 | (2014.01) | |
| H04N 19/156 | (2014.01) | |
| H04N 19/162 | (2014.01) | |
| H04N 19/523 | (2014.01) | |
| H04N 19/513 | (2014.01) | |

(56) References Cited

U.S. PATENT DOCUMENTS

| | | |
|---|---|---|
| 5,270,813 A | 12/1993 | Puri et al. |
| 5,550,847 A | 8/1996 | Zhu |
| 5,555,244 A | 9/1996 | Gupta et al. |
| 5,673,265 A | 9/1997 | Gupta et al. |
| 5,740,176 A | 4/1998 | Gupta et al. |
| 5,757,668 A | 5/1998 | Zhu |
| 5,799,017 A | 8/1998 | Gupta et al. |
| 5,864,542 A | 1/1999 | Gupta et al. |
| 5,964,842 A | 10/1999 | Packard |
| 6,115,689 A | 9/2000 | Malvar |
| 6,192,154 B1 | 2/2001 | Rajagopalan et al. |
| 6,208,688 B1 | 3/2001 | Seo et al. |
| 6,212,232 B1 | 4/2001 | Reed et al. |
| 6,215,820 B1 | 4/2001 | Bagni et al. |
| 6,272,151 B1 | 8/2001 | Gupta et al. |
| 6,292,512 B1 | 9/2001 | Radha et al. |
| 6,343,098 B1 | 1/2002 | Boyce |
| 6,366,704 B1 | 4/2002 | Ribas-Corbera et al. |
| 6,445,312 B1 | 9/2002 | Nguyen |
| 6,667,698 B2 | 12/2003 | Apostolopoulos et al. |
| 6,842,483 B1 | 1/2005 | Au et al. |
| 2002/0021754 A1 | 2/2002 | Pian et al. |
| 2002/0021756 A1 | 2/2002 | Jayant et al. |
| 2002/0025001 A1 | 2/2002 | Ismaeil et al. |
| 2002/0122482 A1 | 9/2002 | Kim et al. |
| 2003/0072364 A1 | 4/2003 | Kim et al. |
| 2003/0123539 A1 | 7/2003 | Kim et al. |
| 2003/0152151 A1 | 8/2003 | Hsieh et al. |
| 2003/0206587 A1 | 11/2003 | Gomila |
| 2004/0001545 A1 | 1/2004 | Chang |
| 2004/0037357 A1 | 2/2004 | Bagni et al. |
| 2004/0057516 A1 | 3/2004 | Kim et al. |
| 2004/0139462 A1 | 7/2004 | Hannuksela et al. |
| 2006/0215755 A1 | 9/2006 | Ju |

FOREIGN PATENT DOCUMENTS

| | | |
|---|---|---|
| EP | 0857394 B1 | 7/2003 |
| EP | 1086593 B1 | 7/2003 |
| EP | 1353514 A2 | 10/2003 |
| EP | 1365592 A2 | 11/2003 |
| EP | 1503595 A2 | 2/2005 |
| WO | 2002096120 A1 | 11/2002 |
| WO | 2004045218 A1 | 5/2004 |
| WO | 2005004491 A1 | 1/2005 |

OTHER PUBLICATIONS

Z. He et al., Low-Power VLSI Design for Motion Estimation Using Adaptive Pixel Truncation, IEEE Transactions on Circuits and Systems for Video Technology, vol. 10, No. 5, Aug. 2000, pp. 669-678.

Y. Liang et al, Power and Content Aware Video Encoding for Video Communication over Wireless Networks, IEEE, SIPS 2004, pp. 269-274.

S. M. Akramullah et al., Optimization of H.263 Video Encoding Using a Single Processor Computer: Performance Tradeoffs and Benchmarking, IEEE Transactions on Circuits and Systems for Video Technology, vol. 11, No. 8, Aug. 2001, pp. 901-915.

W. Burleson et al, Dynamically Parameterized Architectures for Power-Aware Video Coding: Motion Estimation and DCT, IEEE 2001, pp. 4-12.

Y. Liang et al., Analysis and Design of Power Constrained Video Encoder, IEEE 6th CAS Symp. on Emerging Technologies: Mobile and Wireless Comm., Shanghai, China, May 31-Jun. 2, 2004, pp. 57-60.

T.H. Lan et al., Power Optimized Mode Selection for H.263 Video Coding and Wireless Communications, IEEE 1998, pp. 113-117.

PixelTools Corporation, PixelTools Rate Control and H.264, http://www.pixeltools.com/rate_control_paper.html, 2003, 6 pages.

Musmann et al., Advances in Picture Coding, IEEE 1985.

Bretl, W., et al. "MPEG2 Tutorial: Introduction to MPEG 2 Video Compression", www.bretl.com/mpeghtml/mpeg2vcl.htm, Jan. 15, 2000, pp. 1-2.

Chen, Y., "An Error Concealment Algorithm for Entire Frame Loss in Video Transmission", Picture Coding Symposium 2004, Dec. 15-17, 2004, pp. 1-4.

Osako, F., et al., "A Dynamic Computation Resource Scalable Algorithm for Software Video Codec", NTG Fachberichte, VDE Verlag, Berlin, DE, vol. 143, pp. 515-518, XP000986619, ISSN: 0341-0196, Sep. 10, 1997.

Richardson, I., Video codec design, Passage, Video Codec Design Developing Image and Video Compression Systems, XP002372853, Jan. 1, 2002, pp. 226-233.

Richardson, I., Video codec complexity management, XP002309519, Apr. 30, 2001.

Richardson, Iain E.G. "H.264/AVC Frame and Picture Management." www.vcodex.com. Dated Jan. 29, 2004, pp. 1-7.

Richardson, Iain E.G. "H.264/MPEG-4 Part 10: Introduction to CABAC." www.vcodex.com. Dated Oct. 17, 2002, pp. 1-3.

Richardson, Iain E.G. "H.264/MPEG-4 Part 10: Inter Prediction." www.vcodex.com. Dated Apr. 30, 2003, pp. 1-3.

Richardson, Iain E.G. "H.264/MPEG-4 Part 10: Intra Prediction." www.vcodex.com. Dated Apr. 30, 2003, pp. 1-6.

Richardson, Iain E.G. "H.264/MPEG-4 Part 10: Overview." www.vcodex.com. Dated Oct. 7, 2002, pp. 1-3.

Richardson, Iain E.G. "H.264/MPEG-4 Part 10: Transform & Quantization." www.vcodex.com. Dated Mar. 19, 2003, pp. 1-9.

Richardson, Iain E.G. "H.264/MPEG-4 Part 10: Variable Length Coding." www.vcodes.com. Dated Oct. 17, 2002, pp. 1-7.

Wiegand, T., "Overview of the h.264/AVC Video Coding Standard", IEEE Transactions on Circuits and Systems for Video Technology, vol. 13, No. 7, Jul. 2003.

Non-final office action dated Aug. 17, 2010 in U.S. Appl. No. 11/271,693.

Final office action dated Mar. 18, 2011 in U.S. Appl. No. 11/271,693.

Non-final office action dated Jul. 2, 2012 in U.S. Appl. No. 11/271,693.

Final office action dated Nov. 21, 2012 in U.S. Appl. No. 11/271,693.

Notice of Allowance dated Sep. 12, 2016 in U.S. Appl. No. 11/271,693.

Non-final office action dated Mar. 2, 2009 in U.S. Appl. No. 11/539,522.

Final office action dated Aug. 4, 2009 in U.S. Appl. No. 11/539,522.

Final office action dated Feb. 2, 2010 in U.S. Appl. No. 11/539,522.

Non-final office action dated Apr. 26, 2010 in U.S. Appl. No. 11/539,522.

Final office action dated Sep. 8, 2010 in U.S. Appl. No. 11/539,522.

Non-final office action dated Oct. 24, 2014 in U.S. Appl. No. 11/539,522.

Final office action dated Mar. 26, 2015 in U.S. Appl. No. 11/539,522.

Notice of Allowance dated Jun. 5, 2017 in U.S. Appl. No. 11/539,522.

RESOURCE EFFICIENT VIDEO PROCESSING VIA PREDICTION ERROR COMPUTATIONAL ADJUSTMENTS

CROSS-REFERENCE TO RELATED APPLICATION

This application is a divisional of U.S. patent application Ser. No. 11/271,693, filed Nov. 10, 2005, entitled "Resource Efficient Video Processing via Prediction Error Computational Adjustments," which is incorporated herein by reference in its entirety.

BACKGROUND OF THE INVENTION

Field of the Invention

The present invention relates in general to the field of information processing, and more specifically to a system and method for efficiently using video processing resources by adjusting utilization of prediction error computational resources in video encoders.

Description of the Related Art

The number of electronic devices incorporating multimedia technology continues to proliferate. Multimedia technology enables a device to use and present multimedia data. Multimedia data can be used and presented in a variety of forms including full-motion video, animation, graphics, audio, and text. Multimedia data can be transmitted to a variety of devices for use. Such devices include portable electronic devices such as personal computers, server computers, notebook computers, mobile phones, personal digital assistants, video playback devices, and any other device capable of rendering multimedia data.

One of the challenges with digital multimedia relates to the size of multimedia data and particularly video data. Uncompressed digital video data in particular requires a significant number of bits to represent each video frame. Each video frame can be divided into a number of pixels. Pixels represent the smallest unit of video that can be manipulated. Each pixel is represented by a set of bits. For 24-bit color video (8-bits for each of the three color components), each uncompressed video frame is, thus, represented by 24 bits times the number of pixels in each video frame for a 4:4:4 color format. For example, the relatively small 4:2:0 video frames of quarter common intermediate format (QCIF), have 176×144 25,344 luma pixels and 88×72×2=12672 chroma pixels, which requires (25344+12672)×8 bits per frame for uncompressed video. To avoid human perceptible flicker and to maintain smooth motion, video data contains, for example, 30 frames or 60 fields per second of displayed video and, thus, (25344+12672)×8×30 uncompressed bits/second for QCIF video. It is currently impractical to transmit and process such a huge amount of data in a reasonable amount of time.

Digital video compression has become a critical enabling technology for multimedia storage and transmission. Because of the huge data rate of raw digital video data, compression techniques compress a video signal before it can be transmitted or stored. Differential pulse code modulation ("DPCM") and the discrete cosine transform ("DCT") are examples of coding technologies proven effective for successful video compression. DPCM and DCT have become the standard coding technology for current international digital video coding and decoding compression standards such as the International Telecommunication Union ("ITU") H.264, or also called the International Organization for Standardization/International Electrotechnical Commission ("ISO/IEC") MPEG-4 Part 10 Advanced Video Coding ("AVC") standard, and other previous H.26x and MPEG-x standards.

H.264 or MPEG-4 Part 10 AVC utilizes block-based motion compensation and motion estimation to encode video data. Video data includes a video sequence of progressive or interlaced video frames, which may be mixed together in the same sequence. Each video frame essentially represents a 'picture'. When an object has only translational motion from one frame to the next, successive frames are very similar to preceding frames and, thus, exhibit a strong temporal correlation. The similarity between successive frames is referred to as "temporal redundancy." To achieve compression, the temporal redundancy between adjacent frames can be exploited.

One embodiment of video compression involves inter-coding and intra-coding of video frames. At least one of the frames is "intracoded", i.e. coded without using information other than information in the frame itself. Samples in the 'intra' frame are predicted using spatially neighboring samples of previously coded blocks. In addition to being used as a reference frame, intraframe coding can be used when frame-to-frame motion other than translational motion, such as camera pan, zoom, changes in luminance, or rotational motion, is present. Remaining frames in a sequence of intraframes are "intercoded".

Intercoding utilizes motion estimation and motion compensation. Motion estimation technology selects one or more previous or future frames as a reference(s). (Note: the description below is written in the context of one previous frame as the reference frame; however, multiple reference frames can be used.) Motion compensation predicts frames from one or more reference frames and coding the prediction. Motion estimation is the process of choosing a reference frame and determining spatial displacement of an object in a reference frame and a current frame.

One technique of estimating motion uses a block-matching algorithm ("BMA"). Motion estimation examines the movement of objects in a video frame sequence to determine motion vectors representing the estimated motion of the objects. BMAs estimate motion on the basis of rectangular blocks and produce one motion vector for each block. As depicted in FIG. 1, block-matching techniques divide an M-by-N video frame 102 into M×N blocks of pixels 104 [1,1] through 104 [M,N], where "M" and "N" respectively represent the number of block rows and block columns in video frame 102. In at least one embodiment, some blocks overlap each other. The H.264/MPEG-4 Part 10 AVC support dividing the sets of image data into m×n blocks that consist of data generally representing at least the luminance of pixels in each block. The block sizes generally range from 16×16 pixels to 4×4 pixels. A 16×16 set is generally referred to as a "macroblock" 106, and smaller sets are partitions of a macroblock. For example, a 16×16 macroblock can be partitioned into 16×8 (108), 8×16 (110), and 8×8 (112) and sub-partitioned into 8×8 (114), 4×8 (116), 8×4 (118), and 4×4 (120) blocks of pixel data. Smaller blocks can provide enhanced prediction accuracy for a certain video content. Each frame can be divided into combinations of macroblocks, partitioned macroblocks, and sub-macroblock partitions to enhance prediction accuracy while controlling bit rates needed to code each frame. In at least one embodiment, the blocks can be of varying sizes.

FIG. 2 depicts frames and object movement used in a block-matching technique for intercoding video data. For each block in a current frame 202, motion estimation searches a predetermined block-matching search area 204 of the reference frame 206 for a block that best matches ("the best matching block") the block in the current frame 202. Motion estimation uses an error measure to identify the best matching block. The search is generally confined to a subset of the macroblocks in the reference frame that represent the anticipated motion range of an object between the reference frame and the current frame. Motion estimation uses a motion vector 208 to represent the translation between the current block and the best matching block. The error measure used to identify the best matching block becomes a prediction error that represents the difference between the current block and the best matching block. The motion vector and the prediction error can be efficiently coded at a far lower bit rate than individually coding each successive video frame in a sequence of video frames. Thus, interframe redundancy is removed and data compression is achieved. A decoder reconstructs each frame from the motion vector, prediction error, and reference frames.

Researches have investigated several error measures to determine the best matching block and to describe the prediction error. The mean absolute difference ("MAD") is generally considered to be the most favored. The MAD is determined from the sum of absolute difference ("SAD") divided by the m×n pixels in each block. The SAD is represented in Equation [1], and the MAD is represented in Equation [2]:

$$SAD = \sum_{i=1}^{m} \sum_{j=1}^{n} |residual_{i,j}| \quad [1]$$

$$= \sum_{i=1}^{m} \sum_{j=1}^{n} |current\_block_{i,j} - reference\_block_{i,j}|$$

and $$MAD = \frac{SAD}{m \times n} \quad [2]$$

The better the prediction between the current frame and the best matching block, i.e. the smaller the MAD of the best matching block, the smaller the prediction error will be, and, thus, the bit rate for each frame can be smaller. Usually, a rate-distortion measurement is used in motion estimation to balance the MAD and the cost of encoding motion vectors.

Sub-integer pixel motion compensation using interpolation can provide significantly better compression performance and visual quality than integer-pixel motion compensation. The H.264/MPEG-4 AVC has one-half and one-quarter pixel resolution for inter-coded macroblocks, i.e. the accuracy of motion compensation is a half or quarter pixel distance. If the horizontal and vertical components of the motion vector are integers, the current object actually exists in the reference frame in integer pixel position. If one or both components of the motion vector are sub-integers, then the current object exists in an interpolated position between adjacent samples in the reference frame. However, sub-integer pixel motion compensation comes at an increased expense of design complexity and computation time.

U.S. Pat. No. 5,757,668, entitled "Device, Method and Digital Video Encoder of Complexity Scalable Block-Matching Motion Estimation Utilizing Adaptive Threshold Termination", inventor Qin Fan Zhu, filed May 24, 1995, and issued May 26, 1998 ("Zhu Patent") observes that the ultimate goal in practical video compression is not to minimize the prediction error (also referred to as a "matching error") but to optimize the coded video quality under constraints of a given channel bandwidth and processing power. The Zhu Patent discusses terminating the search for a best matching block once the matching error is less than a predetermined threshold. The reasoning behind the Zhu Patent is that under certain circumstances, finding the best matching block neither improves the coded picture quality nor reduces the bitrate. The Zhu Patent identifies a threshold value T based upon a linear function of a quantization stepsize QP (also commonly referred to as a "quantization parameter") and two coefficients "a" and "b" as depicted in Equation [3]:

$$T = a*QP + b \quad [3]$$

The coefficients "a" and "b" are monotonically non-increasing function of a processing quota.

QP is a parameter typically used by a video encoder to regulate how much detail is saved by a video encoder. Video encoders transform prediction errors into a frequency domain by a transform that approximates the DCT. QP determines the step size for associating the transformed coefficients with a finite set of steps. Large values of QP represent big steps that crudely approximate the transform, so that most of the signal can be captured by only a few coefficients. Small values of QP more accurately approximate the block's frequency spectrum, but at the cost of more bits. Thus, when QP is very small, almost all that detail is retained. As QP is increased, some of that detail is aggregated so that the bit rate drops at the price of some increase in distortion and some loss of quality. Thus, the threshold T represents a measure of the quality of video frames.

The Zhu Patent compares the prediction error with the threshold T. If the prediction error is less than the threshold T, the search for the best matching block terminates because continuing the search will result in a nominal improvement of video quality at best. If the prediction error is greater than or equal to the threshold T, the motion estimation process continues searching for the best matching block. Thus, the Zhu Patent describes how to reduce searches for the best matching block.

However, prediction error reduction computations by the encoders and decoders of video processing systems continue to be very numerous and require a significant amount of power. Devices with limited computational resources and power reserves are still often strained by the prediction error reduction computational requirements of conventional video data processing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
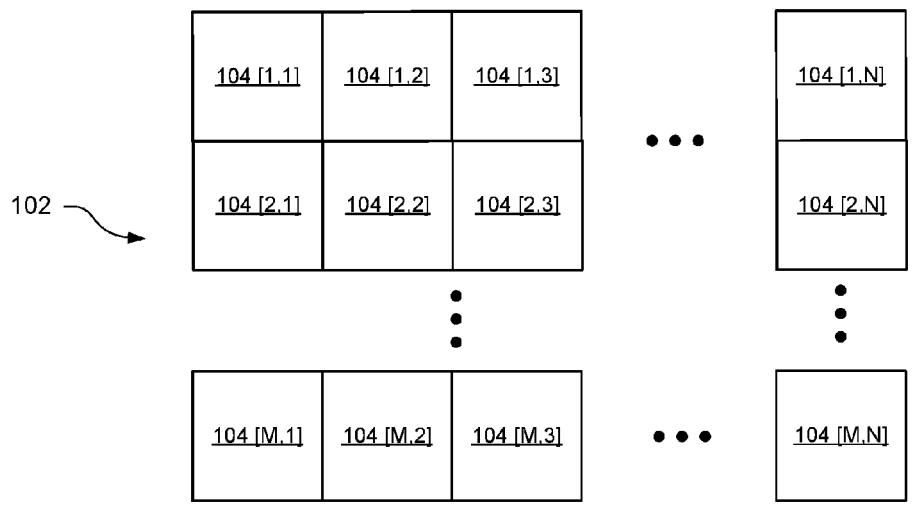
FIG. 1 (labeled prior art) depicts image data divided into macroblocks, macroblock partitions, and macroblock sub-partitions.
Figure 1:
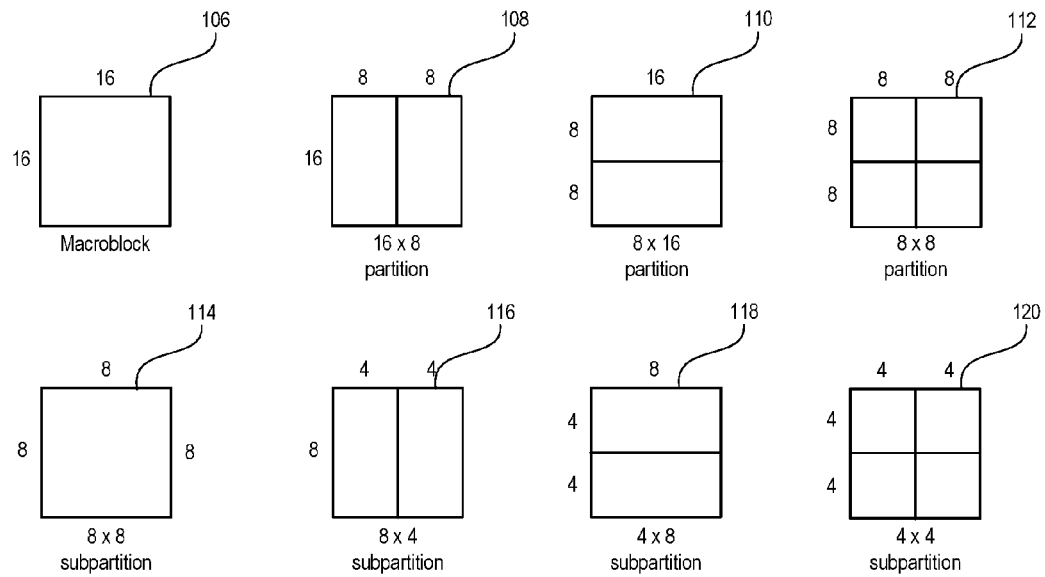
Figure 2:
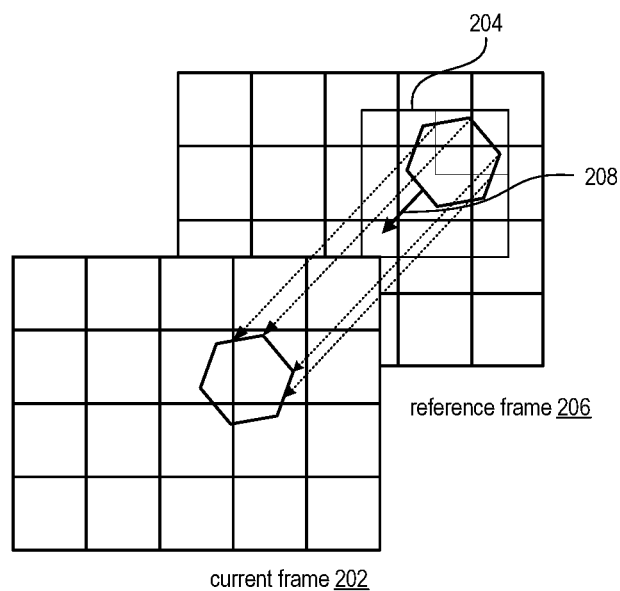
FIG. 2 (labeled prior art) depicts a block-matching technique for interceding video data.

A video processing system dynamically adjusts video processing prediction error reduction computations in accordance with the amount of motion represented in a set of image data and/or available memory resources to store compressed video data. In at least one embodiment, video processing system adjusts utilization of prediction error computational resources based on the size of a prediction error between a first set of image data and a reference set of image data relative to an amount of motion between a first set of image data and the reference set of image data. The relative amount of motion can be indicated, for example, using motion vectors. Additionally, in at least one embodiment, the video processing adjusts utilization of prediction error computation resources based upon a fullness level of a data buffer relative to the amount of motion between the first set of image data and the reference set of image data.

In at least one embodiment, the prediction error, buffer level availability, and amount of motion are employed to adjust utilization of prediction error reduction computation resources by making adjustments based on a motion based comparison between the complexity level of a set of image data and a motion based threshold and/or a resource based comparison between the complexity level of the set of image data and a resource usage threshold of the video processing system. In one embodiment, the set of image data represents a block of pixel data selected from a video frame. In at least one embodiment, the complexity level of the image data set relates to the amount of motion represented in the set of image. The complexity level of the image data set can be evaluated by comparing an image data set prediction error with a motion based threshold. The motion based threshold can be a variable that depends upon an evaluation of the motion represented by the image data set. In at least one embodiment, the resource usage threshold represents a measure of available resources to perform video processing prediction error reduction computations. For example, data buffers generally store compressed video to maintain a near constant output bitrate. As capacity of the data buffer decreases, an increasing amount of prediction error reduction computations may need to be performed to better compress the video data and, thus, preserve buffer capacity.

Adjustable utilization of prediction error computational resources can effectively adjust processing time and power consumption to meet the dynamic needs of the video processing system while attempting to preserve processed video quality. Sub-integer pixel interpolation represents one prediction error reduction computational resource that directly affects processing time and power consumption. At least one embodiment of the video processing system determines whether the video processing performs sub-integer pixel interpolation or not based upon the motion based comparison and/or the resource based comparison. Furthermore, in at least one embodiment, a user can select whether or not to use prediction error reduction computation adjustment technology.

Figure 3:
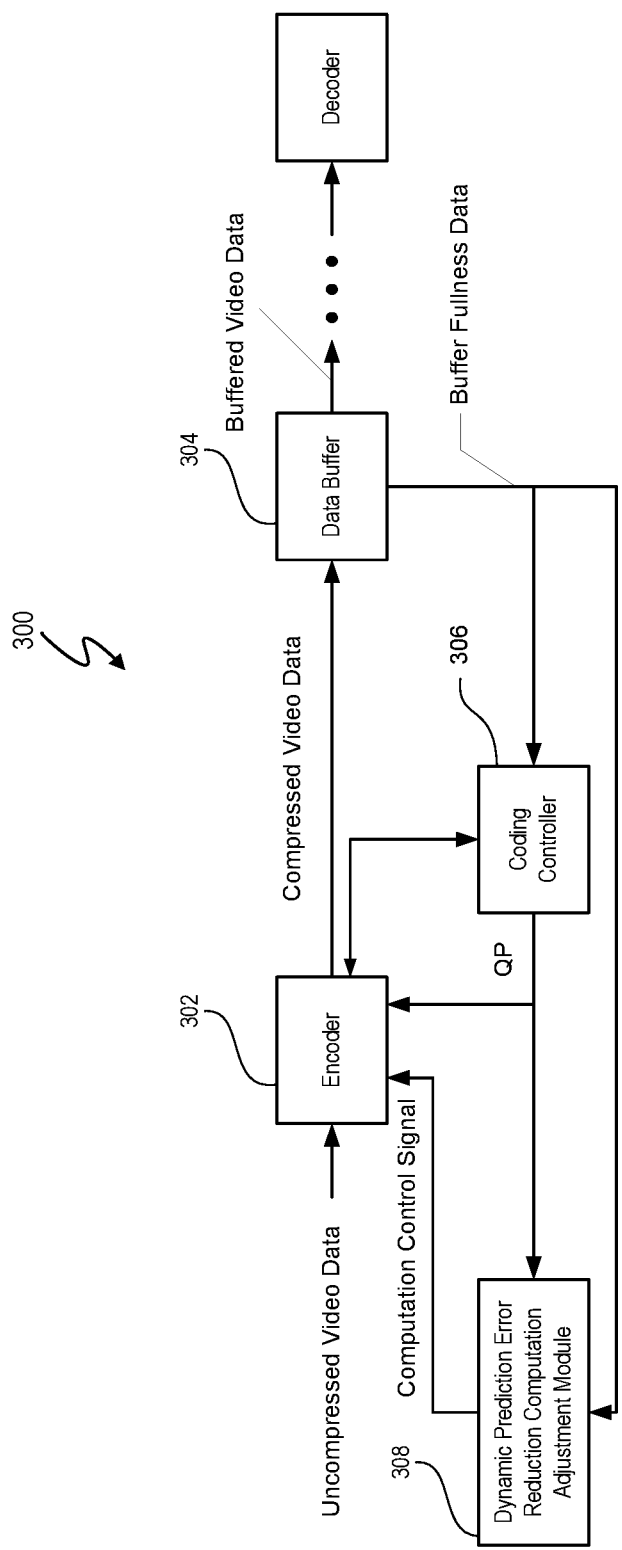
FIG. 3 depicts a video processing system with dynamic prediction error reduction computation adjustment.

FIG. 3 depicts video processing system 300 then receives uncompressed video data as input, compresses the video data, buffers the video data, and provides a video bitrate stream output. The encoder 302 compresses the video data by encoding the video data in accordance with, for example, video encoding standards such as H.264/MPEG-4 AVC. As previously described, block-matching intercoding processes can use sub-integer pixel interpolation to reduce prediction error associated with an image data set. Reducing the prediction error allows for more compression and, thus, a more compact representation of the image data set. Performing sub-integer pixel interpolation requires utilization of more prediction error computational resources than integer pixel interpolation.

The video processing system 300 also includes a data buffer 304 to provide a predetermined bitrate video stream to a receiving device. Generally, data can be transmitted at a predetermined bitrate, often a fixed rate. The size of the compressed video data from the encoder 302 varies depending upon the amount of compression applied to a particular set of video image data. Thus, the encoder is able to send a set of more compressed video image data at an effectively faster bitrate than a set of less compressed video image data. The data buffer 304 temporarily stores compressed video data supplied by the encoder 302 and transmits the buffered video stream at a predetermined bitrate, which is generally a constant bitrate.

The coding controller 306 helps insure that the data buffer 304 does not overflow or underflow. The coding controller 306 includes components that determine the rate control of encoder 302 and selects between an intra coding mode and an intercoding mode. The data buffer 304 provides a buffer fullness data signal to coding controller 306 that provides an indication of the current, remaining data capacity of data buffer 304. If the data buffer 304 becomes overloaded, one or more frames of video data will generally be skipped. In an attempt to avoid skipping frames, the rate controller can adjust the quantization parameter ("QP") used by the encoder 302. During the compression process, the encoder 302 transforms the prediction error into a frequency domain using a transform in H.264/MPEQ-4 AVC, such as an integer transform that approximates the discrete cosine transform. The encoder 302 quantizes the transformed coefficients using quantization step sizes. The quantization step sizes are directly determined from the QP. Small values of QP more accurately represent the prediction error, and, thus, provide a better picture quality. However, small values of QP result in less compression and, thus, a higher bitrate per frame. Likewise, large values of QP represent the prediction error less accurately and, thus, provide a relatively inferior picture quality with the benefit of a lower bitrate. Thus, the QP, in general, represents a degree of complexity of the current video frame. It also follows that the rate controller can control the fullness of the data buffer 304 by using the QP to control the bitrate of the compressed video data.

The dynamic prediction error reduction computation adjustment module 308 (also referred to herein as "dynamic computation adjustment module 308" for conciseness) adjusts utilization of prediction error reduction computation resources in the encoder 302 by, for example, monitoring the amount of motion in a first set of image data, monitoring the prediction error between the current set of image data, and monitoring the fullness of data buffer 304. The first set of image data is, for example, the current set of image data being processed. In at least one other embodiment, a user can manually control the operational status of the dynamic computation adjustment module 308 via a power save factor control signal. In one embodiment, the power save factor control signal selectively enables and disables the dynamic computation adjustment module 308. The dynamic computation adjustment module 308 provides a prediction error reduction computation adjustment signal to the encoder 302 that adjusts prediction error reduction computational resource utilization of the encoder 302. In at least one embodiment, the dynamic computation adjustment module 308 controls whether or not encoder 302 performs sub-integer interpolation on a set of video image data, such as a frame of video data. Thus, dynamic computation adjustment module 308 can indirectly control the amount of compression for a sets of video image data, the bitrate of the compressed video data signal, the resolution of the compressed video data signal, and the fullness of data buffer 304.

The dynamic computation adjustment module 308 can be implemented using hardware, software, or a combination of hardware and software. In one embodiment, the video processing system 300 is implemented in software, stored in a memory, and executed by a processor of video processing system 300.

Figure 4:
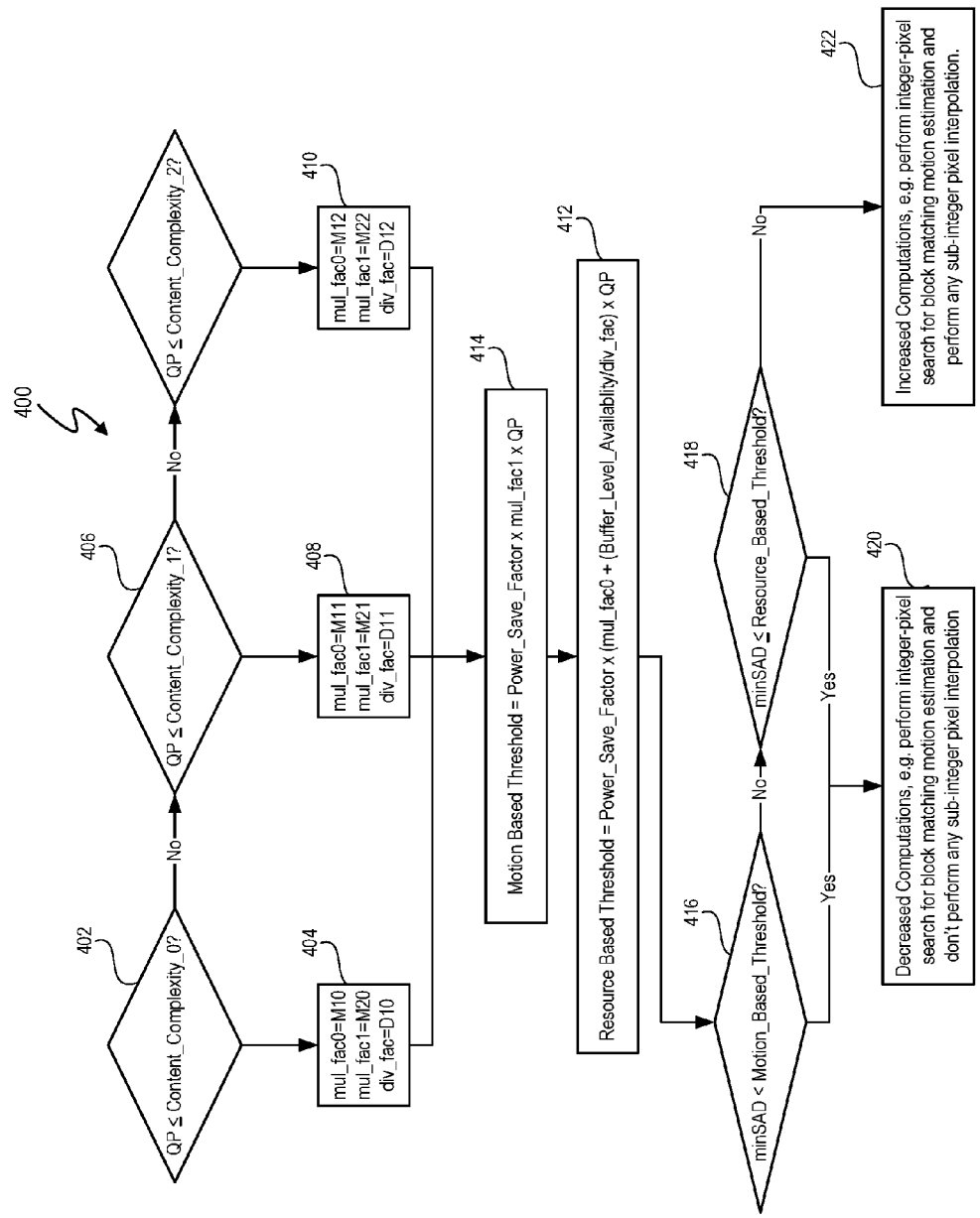
FIG. 4 depicts a dynamic prediction error reduction computation adjustment process performed by a dynamic computation adjustment module of the video processing system of FIG. 3.

Referring to FIGS. 3 and 4, the dynamic computation adjustment module 308 operates in accordance with the dynamic prediction error reduction computation adjustment process 400 (also referred to herein as "computation adjustment process 400" for conciseness). In at least one embodiment, computation adjustment process 400 determines the prediction error reduction computation adjustment signal based on the size of a prediction error between a set of current image data and a reference set of image data relative to an amount of motion in the first set of image data. Additionally, in at least one embodiment, computation adjustment process 400 determines the prediction error reduction computation adjustment signal based upon a fullness level of data buffer 304 relative to the amount of motion in the first set of image data.

The computation adjustment process 400 evaluates the complexity of a set of video image data, such as a video frame, based on the value of QP for the set of video image data. In at least one embodiment, the complexity of the set of video image data is determined to be in one of three groups based on a comparison between QP and two content complexity values, respectively labeled Content_Complexity_0 and Content_Complexity_1. The number of and values of the complexity values used by computation adjustment process 400 is a matter of design choice based on the overall encoder performance. The content complexity values are intended to represent a measure of complexity of the image data. In at least one embodiment, the measure of complexity indicates an amount of motion between a current set of image data and a reference set of image data. Content_Complexity_0 and Content_Complexity_1 are set at the respective boundaries of small/medium motion and medium/large motion. Content_Complexity_0 and Content_Complexity_1 can be determined, for example, manually and set to pre-determined, fixed values or dynamically based on actual measures of video motion.

Initial operation 402 compares QP for the current set of image data to Content_Compexity_0. If QP is less than or equal to Content_Compexity_0, operation 404 respectively sets the variables mul_fac0, mul_fac1, and div_fac to values M10, M20, and D10. As explained in more detail below, the values of the variables mul_fac0, mul_fac1, and div_fac are later used by computation adjustment process 400 to determine a motion based threshold and a resource based threshold. In operation 406, if QP is greater than Content_Complexity_0 and less than or equal to Content_Complexity_1, operation 408 respectively sets the variables mul_fac0, mul_fac1, and div_fac to values M11, M21, and D11. Otherwise, operation 410 respectively sets the variables mul_fac0, mul_fac1, and div_fac to values M12, M22, and D12.

Operation 412 determines a resource based threshold ("RBT") based on the values of mul_fac0, QP, buffer level availability, div_fac), and a value of the variable Power_Save_Factor. The RBT represents a resource availability based factor used in determining whether prediction error computational resources of encoder 302 can be adjusted to reduce or increase the amount of prediction error reduction computations, such as pixel interpolation calculations. The Power_Save_Factor represents the value of the power save factor control signal. In one embodiment, the Power_Save_Factor is one of the values in the range from zero (0) to sixteen (16). Operation 412 sets the RBT in accordance with Equation [4]:

$$RBT = \text{Power\_Save\_Factor} \times \left(\text{mul\_fac0} + \left(\frac{\text{Buffer\_Level\_Availability}}{\text{div\_fac}}\right) \times QP\right). \quad [4]$$

Operation 414 determines a motion based threshold ("MBT") based on the values of mul_fac1, QP, and a value of the variable Power_Save_Factor. The MBT represents a motion based factor used in determining whether prediction error computational resources of encoder 302 can be adjusted to reduce or increase the amount of prediction error reduction computations, such as pixel interpolation calculations. Operation 414 sets the MBT in accordance with Equation 5:

$$MBT = \text{Power\_Save\_Factor} \times \text{mul\_fac1} \times QP \quad [5].$$

The variable values established in operations 404, 408, and 410 make the value of MBT and RBT progressively higher given a certain buffer fullness level when the complexity of a picture increases.

Operations 416 and 418 determine whether or not to increase or decrease prediction error reduction computations of encoder 302. In at least one embodiment, operations 416 and 418 determine whether or not encoder 302 performs sub-integer interpolation, or a small amount of sub-integer interpolation. The values of the MBT and, thus, the variable values from which the MBT is derived, are determined so that encoder 302 is more likely to perform sub-integer pixel interpolation as the amount of motion in an image set increases. Similarly, the values of MBT and, thus, the variable values from which the MBT is derived, are determined so that encoder 302 is more likely to perform sub-integer pixel interpolation as the amount of data buffer availability decreases.

Operation 416 not only adjusts the amount of prediction error reduction computations by encoder 302 based upon motion represented by a set of image data, operation 416 also considers the amount of intercoding prediction error. Thus, if the prediction error is relatively small, then any increase in image quality due to sub-integer interpolation is generally nominal at best. To achieve an adjustment determination based on motion and prediction error, operation 416 compares the minimum sum of absolute difference ("minSAD") (determined as in Equation 1) with the MBT. If the minSAD is less than the MBT, then the amount of motion represented by the current image data relative to the prediction error is small enough to decrease prediction error reduction computations of encoder 302 without significantly compromising image quality.

Figure 5:
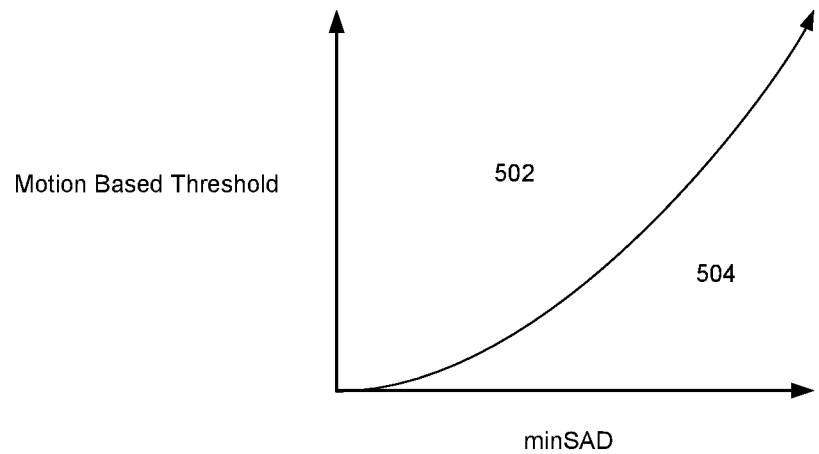
FIG. 5 depicts a relationship between a minimum sum of absolute difference determination and motion based threshold.

FIG. 5 depicts one embodiment of an example relationship between minSAD and the MBT. In the region 502, the relationship between minSAD and the MBT indicates that encoder 302 should perform only integer pixel searches during motion estimation without performing sub-integer pixel interpolation. In the region 504, the relationship between minSAD and the MBT indicates that encoder 302 should perform integer pixel searches during motion estimation and perform sub-integer pixel interpolation. Thus, if the determination in operation 416 is 'yes', operation 420 sets the value of the computation adjustment control signal to cause encoder 302 to decrease the prediction error reduction computations. As discussed previously, in at least one embodiment, decreasing encoder 302 prediction error reduction computations results in performing only integer pixel interpolation during block matching motion estimation.

If the MBT is less than or equal to the minSAD, operation 418 determines whether the minSAD is greater than or equal to the RBT. Operation 418 not only adjusts the amount of prediction error reduction computations by encoder 302 based upon available memory in data buffer 304, operation 418 also considers the amount of intercoding prediction error and complexity of the current set of image data.

Figure 6:
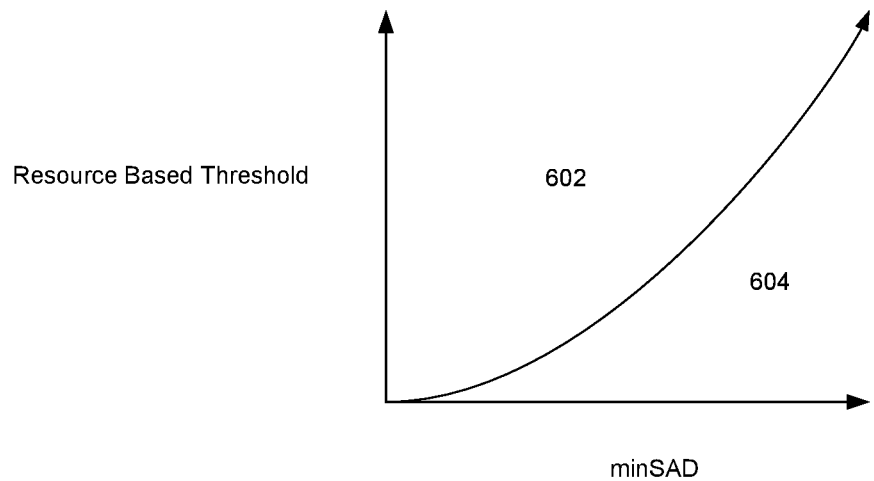
FIG. 6 depicts a relationship between a minimum sum of absolute difference determination and resource based threshold.

FIG. 6 depicts one embodiment of an example relationship between minSAD and the RBT. In the region 602, the relationship between minSAD and the RBT indicates that encoder 302 should perform only integer pixel searches during motion estimation without performing sub-integer pixel interpolation. In the region 604, the relationship between minSAD and the RBT indicates that encoder 302 should perform integer pixel searches during motion estimation and perform sub-integer pixel interpolation.

Operation 418 performs a balancing operation between the size of the prediction error against the RBT, which factors in available memory in data buffer 304 and the amount of motion in the current set of image data. As the prediction error decreases, video processing system 300 can tolerate a larger RBT, and, thus, a higher degree of motion and/or lower available memory in data buffer 304 without causing memory shortages in data buffer 304 because decreases in the size of the compressed video data due to sub-integer interpolation is generally nominal at best. Likewise, as the prediction error increases, a larger RBT, and, thus a higher degree of motion and/or lower available memory in data buffer, can exceed the memory capacity of data buffer 304. Accordingly, prediction error reduction computations, such as sub-integer pixel interpolation, can be used to reduce the size of the compressed video data stored in data buffer 304.

To achieve an adjustment determination based on motion and prediction error, operation 418 compares the minimum sum of absolute difference ("minSAD") (determined as in Equation 1) with the RBT. If the minSAD is less than the RBT, then the amount of motion and/or the amount of memory available in data buffer 304 represented by the current image data relative to the prediction error is small enough to decrease prediction error reduction computations of encoder 302 without significantly compromising image quality. Thus, if the determination in operation 418 is 'yes', operation 420 sets the value of the computation adjustment control signal to cause encoder 302 to decrease the prediction error reduction computations. As discussed previously, in at least one embodiment, decreasing encoder 302 prediction error reduction computations results in performing only integer pixel interpolation during block matching motion estimation. If the outcome of operation 418 is "no", then operation 422 causes encoder 302 to performed increased prediction error reduction computations, such as an integer pixel search for block matching and sub-integer pixel interpolation. Following operations 420 and 422, computation adjustment process 400 repeats for the next set of image data, such as a frame of video data.

Although operations 416 and 418 use the minSAD as a measure of the prediction error, which also is often representative of the complexity of the image data, other measures can also be used.

Figure 7:
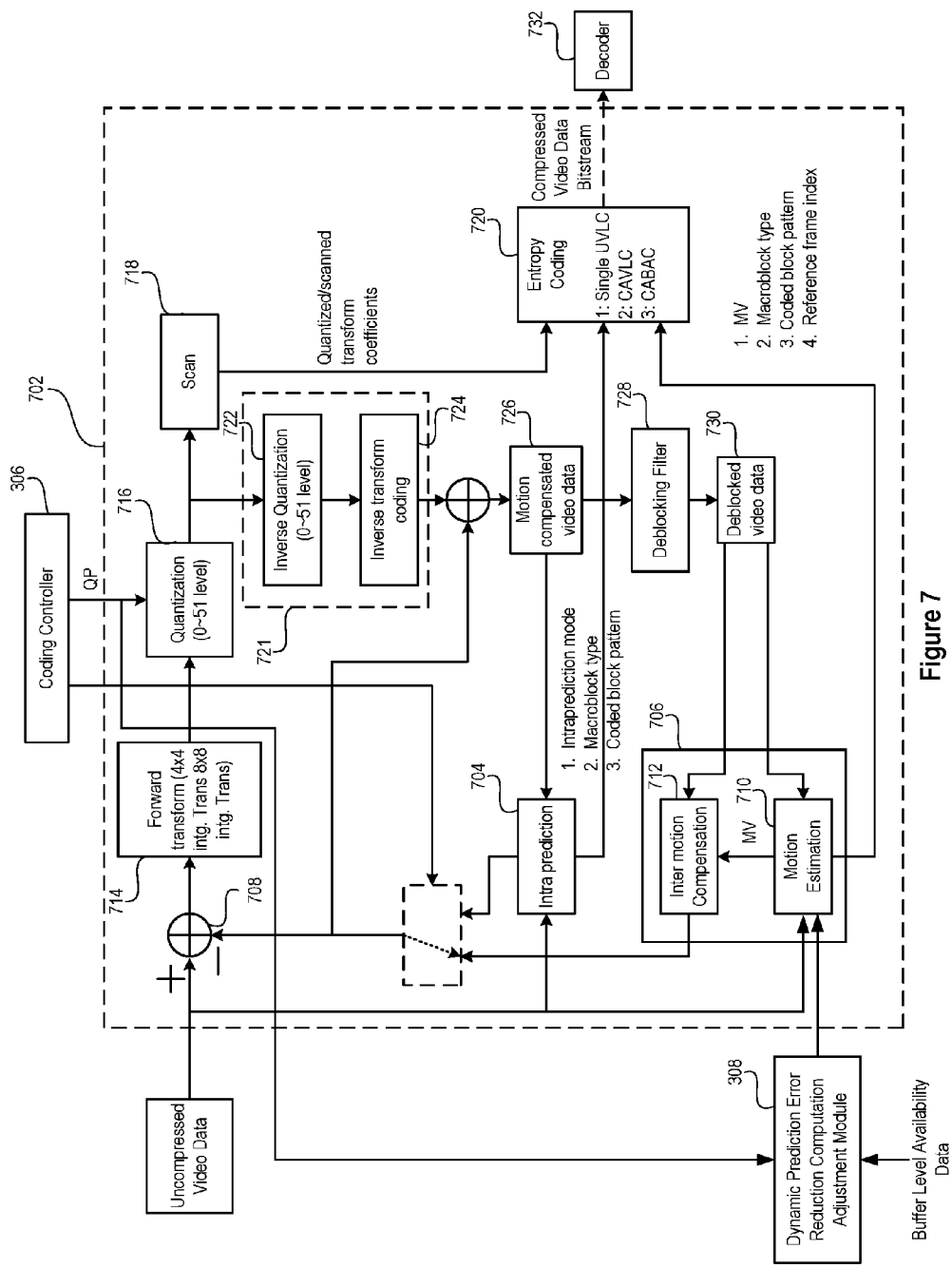
FIG. 7 depicts an encoder for use in the video processing system of FIG. 3.

FIG. 7 depicts a video encoder 702, which in one embodiment represents encoder 302. The encoder 702 converts the uncompressed video input data into a compressed video data bitstream. The uncompressed video input data is provided to the intra prediction module 704, the intercoding module 706, and a summer 708. The intercoding module 706 includes a motion estimation component 710 that, in at least one embodiment, operates as previously discussed to produce a motion vector ("MV"). The motion vector is used by the intermotion compensation module 712 and encoded by entropy coding block 720. The dynamic computation adjustment module 308 operates as discussed above to dynamically adjust video processing prediction error reduction computations in accordance with the amount of motion represented in a set of image data and/or available memory resources to store compressed video data. The mixer 708 determines the difference between the uncompressed video data and either intra-prediction data or inter-motion data as selected by the coding controller 306, which includes an intra/inter mode decision engine and a rate control engine. Intra-prediction data is coded without using information outside of information within a video frame. In at least one embodiment, coding controller 306 selects the intra-prediction data for mixing with the uncompressed video data for the first frame in a sequence and at random access points. For all remaining image data, inter motion compensation data is subtracted from the uncompressed video data.

The difference (or residual) data between the uncompressed video data (original video data) and the predicted data is transformed by forward transform module 714 using for example a discrete cosine transform ("DCT") algorithm. The coefficients from the DCT transformation are scaled to integers and quantized by quantization module 716. The coding controller 306 controls the quantization step size via the control quantization parameter QP supplied to the quantization module 716. The quantized transform coefficients are scanned by scan module 718 and entropy coded by entropy coding module 720. The entropy coding module 720 can employ any type of entropy encoding such as Universal Variable Length Codes ("UVLC"), Context Adaptive Variable Length Codes ("CAVLC"), Context-based Adaptive Binary Arithmetic Coding ("CABAC"), or combinations thereof. The entropy coded transform coefficients and intra/inter coding information (i.e. either intra-prediction mode or inter-prediction mode information) are transmitted along with motion vector data for future decoding. When the intra prediction module 704 is associated with the current entropy encoded transform coefficients, the intraprediction mode, macroblock type, and coded block pattern are included in the compressed video data bitstream. When the intercoding module 706 is associated with the current entropy encoded transform coefficients, the determined motion vector, macroblock type, coded block pattern, and reference frame index are included in the compressed video data.

The encoder 702 also includes a decoder 721 to determine predictions for the next set of image data. Thus, the quantized transform coefficients are inversed quantized by inverse quantization module 722 and inverse transform coded by inverse transform coding module 724 to generate a decoded prediction residual. The decoded prediction residual is added to the predicted data. The result is motion compensated video data 726 which is provided directly to the intraprediction module 704. The motion compensated video data 726 is also provided to deblocking filter 728 which deblocks the video data 726 to generate deblocked video data 730, which is fed into the intercoding module 706 for potential use in motion compensating the current image data.

The compressed video data bitstream is ultimately provided to a decoder 732. The compressed video data bitstream may be stored or further processed before being provided to decoder 732. The decoder uses the information in the compressed video data bitstream to reconstruct the uncompressed video data. In one embodiment, the encoder 702 and decoder 732 code and decode video data in accordance with the H.264/MPEG-4 AVC video coding standard.

Video coding benefits from the dynamic computation adjustment reducing the coding processing. Since decoder 732 performs a reverse process of encoder 702, computation reductions by encoder 702 are shared by decoder 732.

Simulation results indicate that the video processing system 300 achieves performance improvements by adjusting utilization of prediction error computational resources while maintaining a comparable signal-to-noise ratio ("SNR") relative to conventional technology. The following tables tabulate simulation results when video processing system 300 adjusts utilization of prediction error computational resources by reducing the number of half and quarter pixel (also referred to as "pel") interpolations. The simulation sequences are standard sequences used to measure encoder performance. The sequences have varying amounts of motion. Thus, it is expected that performance improvements of video processing system 300 are particularly noticeable for video sequences with relatively small amounts of motion such as the Akiyo and News sequences. The encoder data for Table 1 and Table 2 was obtained for Quarter Common Interchange Format ("QCIF") (176×144 pixels) at 15 frames/second. The encoder data for Table 3 and Table 4 was obtained for Common Interchange Format ("CIF") (352× 240 pixels) at 30 frames/second. CIF and QCIF are common formats for devices with displays of approximately less than 2-3 inches, such as cell phones and personal digital assistants.

Table 1 represents simulation data obtained using conventional encoder technology for a given coding algorithm and a given coding configuration. Table 2 represents simulation data obtained using video processing system 300 based on the same given coding algorithm and coding configuration. The signal to noise ratios nominally differ, and video processing system 300 achieves an average 40.429% reduction in the number of half/quarter pixel interpolations performed by video processing system 300 as well as for a decoder during decoding. Thus, video processing system 300 is able to better utilize encoding resources.

TABLE 1

| Sequence | bitrate | Composite PSNR | Lume PSNR | # of frames coded |
|---|---|---|---|---|
| Foreman | 64.19 | 30.27 | 28.9 | 198 |
| Akiyo | 64.3 | 42.47 | 41.7 | 150 |
| Coastguard | 64.44 | 31.37 | 29.7 | 150 |
| Container | 63.35 | 38.09 | 37 | 149 |
| News | 63.66 | 36.58 | 35.5 | 148 |
| Football | 64.11 | 26.09 | 24.6 | 131 |
| Average | 64.01 | 33.196 | 32.90 | 152.7 |

TABLE 2

| Sequence | bitrate | Composite PSNR | Lume PSNR | # of frames coded | % of reduction in half/quarter-pel intp. |
|---|---|---|---|---|---|
| Foreman | 64.34 | 30.28 | 28.9 | 199 | 17 |
| Akiyo | 64.16 | 42.1 | 41.4 | 149 | 79 |
| Coastguard | 64.47 | 31.33 | 29.7 | 150 | 11 |
| Container | 63.17 | 38.02 | 36.9 | 149 | 51 |
| News | 64.4 | 36.27 | 35.2 | 149 | 65 |
| Football | 64.29 | 26.09 | 24.6 | 131 | 34 |
| Average | 64.14 | 33.074 | 32.78 | 152.7 | 40.429 |

Table 3 represents decoding of simulation data that was encoded using conventional encoder technology. Table 4 represents decoding of simulation data that was encoded using video processing system 300. The signal to noise ratios nominally differ, and video processing system 300 achieves an average 54.8% reduction in the number of quarter pixel interpolations performed by the decoder, such as decoder 732. Thus, encoding video data using video processing system 300 also improves performance of decoders.

TABLE 3

| Sequence | bitrate | Composite PSNR | Lume PSNR | # of frames coded |
|---|---|---|---|---|
| Foreman | 382.01 | 33.18 | 31.94 | 400 |
| Akiyo | 384.42 | 44.15 | 43.4 | 300 |
| Coastguard | 384.1 | 31.04 | 29.4 | 299 |
| Football | 374.33 | 28.46 | 27 | 261 |
| Average | 381.22 | 33.074 | 32.94 | 152.7 |

TABLE 4

| Sequence | bitrate | Composite PSNR | Lume PSNR | # of frames coded | % of reduction in half/quarter-pel intp. |
|---|---|---|---|---|---|
| Foreman | 382.42 | 33 | 31.8 | 400 | 61 |
| Akiyo | 385.45 | 43.88 | 43.1 | 300 | 83 |
| Coastguard | 384.1 | 31.01 | 29.4 | 299 | 65 |
| Football | 373.98 | 28.42 | 27 | 261 | 27 |
| Average | 381.49 | 33.074 | 32.83 | 152.7 | 54.8 |

Although the present invention has been described in detail, it should be understood that various changes, substitutions and alterations can be made hereto without departing from the spirit and scope of the invention as defined by the appended claims.

What is claimed is:

1. A method of adjusting utilization of prediction error computational resources of a video processing system during processing of video data, wherein the video data includes multiple sets of image data, the method comprising:
   determining a complexity level of a first set of image data;
   determining at least one of: (1) a motion based comparison between the complexity level of the first set of image data and a motion based threshold, wherein the motion based threshold is associated with relative motion between the first set of image data and a reference set of image data and (2) a resource based comparison between the complexity level of the first set of image data and a resource usage threshold of the video processing system; and adjusting utilization of prediction error computational resources of the video processing system during processing of video data based on values of at least one of: (1) the motion based comparison and (2) the resource based comparison.

2. The method of claim 1 further comprising:
determining a first relative motion factor based on a quantization parameter value of the video processing system;
generating the motion based threshold using the first relative motion factor;
determining a second relative motion factor based on the quantization parameter value of the video processing system; and
generating the resource usage threshold using the second relative motion factor.

3. The method of claim 2 wherein determining the first relative motion factor based on a quantization parameter value of the video processing system comprises:
comparing the quantization parameter to a one or more image data complexity thresholds.

4. The method of claim 3 wherein each image data complexity threshold is selected from the group consisting of: a predetermined threshold and a threshold having a value dynamically adaptive to image data complexity.

5. The method of claim 1 wherein each set of image data comprises a block of data and the block of data is a member of the group comprising: a 16×16 partition of pixel data, a 16×8 partition of pixel data, an 8×16 partition of pixel data, an 8×8 partition of pixel data, a 4×8 partition of pixel data, an 8×4 partition of pixel data, and a 4×4 partition of pixel data.

6. A video processing system, comprising:
an encoder comprising prediction error computational resources for encoding video data comprising multiple sets of image data;
a data buffer coupled to the encoder to provide a predetermined bitrate encoded video data stream and to generate a fullness measure of for the data buffer; and
a dynamic prediction error reduction computation adjustment module which adjusts utilization of the prediction error computational resources in the encoder during processing of video data based on values of at least one of a group consisting of: (1) a motion based comparison between the complexity level of the first set of image data and a motion based threshold, wherein the motion based threshold is associated with relative motion between the first set of image data and a reference set of image data and (2) a resource based comparison between the complexity level of the first set of image data and a resource usage threshold of the video processing system.

7. The video processing system of claim 6 wherein the dynamic prediction error reduction computation adjustment module determines a first relative motion factor based on a quantization parameter value of the video processing system, generates the motion based threshold using the first relative motion factor, determining a second relative motion factor based on the quantization parameter value of the video processing system, and generates the resource usage threshold using the second relative motion factor.

8. The video processing system of claim 7 wherein the dynamic prediction error reduction computation adjustment module compares the quantization parameter to a one or more image data complexity thresholds to determine the first relative motion factor.

* * * * *